United States Patent
Ertsgaard

[11] 3,744,423
[45] July 10, 1973

[54] GASEOUS OPTICAL FILTER
[75] Inventor: Edwin P. Ertsgaard, Rochester, N.Y
[73] Assignee: The United States of America as represented by the Secretary of the Navy, Washington, D.C.
[22] Filed: Dec. 27, 1961
[21] Appl. No.: 162,609

[52] U.S. Cl. ............... 102/70.2 P, 350/3, 350/312
[51] Int. Cl. .................................. F42b 5/08
[58] Field of Search ............... 88/107, 57 F, 57.2 C; 350/3, 312; 102/70.2 P

[56] References Cited
UNITED STATES PATENTS
2,742,550   4/1956   Jenness, Jr. ........................ 338/11
FOREIGN PATENTS OR APPLICATIONS
1,072,828   1/1960   Germany ............................ 88/107

Primary Examiner—Samuel Feinberg
Attorney—R. S. Sciascia and J. A. Cooke

EXEMPLARY CLAIM

1. An optical filter for discrimination purposes in the infrared region comprising a casing containing an infrared absorbing gas which is effective to produce an extremely sharp absorption cut-off point when infrared radiation having wavelengths within a predetermined range is applied thereto thereby is effective to pass infrared radiation of wavelengths outside of said range, said casing having a circular configuration for close fitting engagement with a complementary aperture within the nose of a proximity fuze.

10 Claims, 3 Drawing Figures

3,744,423

INVENTOR.
EDWIN P. ERTSGAARD

GASEOUS OPTICAL FILTER

This invention relates to a gaseous optical filter for solar discrimination purposes in the infrared region. More particularly, the filter is suitable for use with a proximity fuze to absorb certain undesirable infrared radiation while transmitting other infrared radiation to the sensing portion of the fuze.

It is therefore an object of this invention to provide a sharp cutting filter to absorbing unwanted infrared radiation.

It is another object to use gaseous filters for such discrimination purposes, which filters are capable of variation of shifting of the spectral absorption cut.

It is a further object to utilize such gaseous filters for solar discrimination purposes in which the spectral absorption cut-off may be shifted by varying the pressure of the gas within the filter housing, or by the controlled addition of certain impurities to the gas.

Other objects and various further features of novelty and invention will be apparent to those skilled in the art from a reading of the following specification in conjunction with the accompanying drawing, which shows, for illustrative purposes only, a preferred form of the invention and in which.

Figure 1:
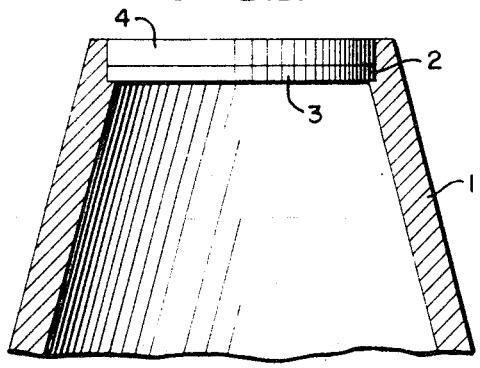
FIG. 1 is an enlarged view of the filter seated in the forward end of the casing for a proximity fuze.
Figure 2:
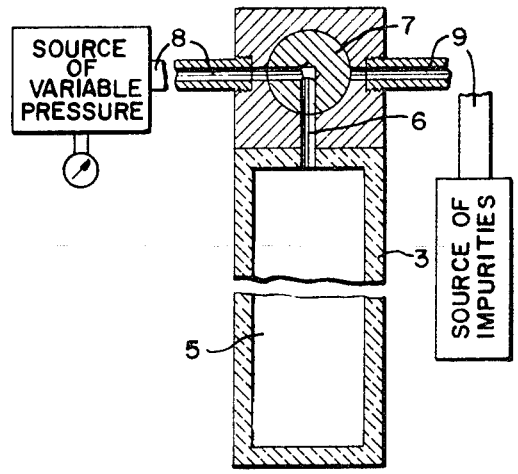
FIG. 2 is a schematic sectional view of the filter.

Referring now to FIG. 1, the forward end of the casing 1 for the proximity fuze is formed with a recessed portion 2 in which a gaseous filter 3 and a window 4 are seated. The window 4 may contain calcium aluminate, an excellent transmitter of infrared rays, and an anti-reflection coating to insure the transmission of infrared radiation. As shown in FIG. 2, the gaseous filter 3 has a hollow interior 5 and an aperture 6 which may be selectively connected to the line 8 or the line 9 by suitable valve means 7. The exterior surface of the filter may be formed of any transmitting material which has no effect upon infrared radiation. The hollow interior 5 of the filter is filled with a suitable infrared-absorbing gas such as nitrous oxide, aluminum borohydride or carbon dioxide. The pressure of the gas in the filter may be varied by connecting the aperture 6 to the line 8 which is in turn connected to a suitable pressure varying means. The aperture 6 may be connected to the line 9 which communicates with a suitable impurity source.

Such gases, as a state of matter, produce an extremely sharp absorption cut because of the limited transferability of energy between the absorbing particles. In other words, the gas molecules are separated by such comparatively large distances that sympathetic vibrations and momentum transfer owing to absorbed photon energy become insignificant. As a result, when energy is absorbed in discrete frequency regions, closely bounding regions are unaffected and these frequencies are therefore transmitted. The lattice structure of solids, on the other hand, does cause an appreciable transfer of this absorbed energy, since the basic bonding structure of solids forces particles to vibrate, many of which would not be affected by the incident photons alone. It is this advantageous property of such gases as nitrous oxide, aluminum borohydride and carbon dioxide that is utilized in this invention.

Figure 3:
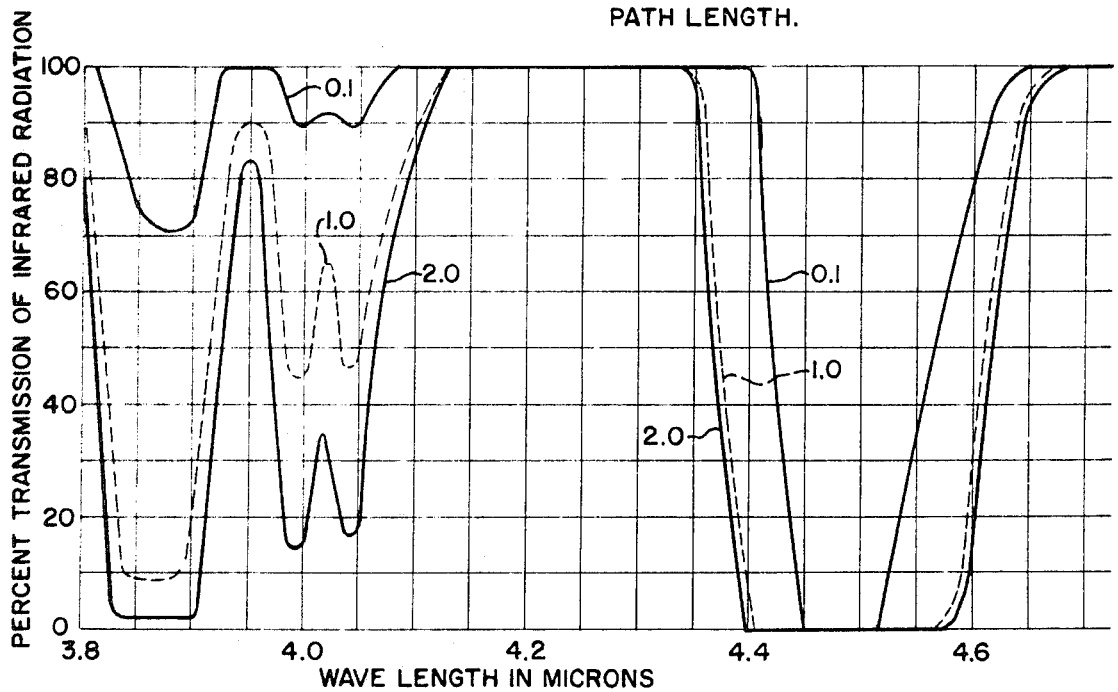
FIG. 3 is a graphical representation of the infrared frequencies transmitted by a certain gas under different pressures to be used as the filter.

Different gases absorb in different infrared regions and the gas chosen for a specific application depends on the desired rejection band. In addition, it is desirable for the gas to have high transmission in all other regions. Variation of the absorption edge, or "fine tuning" is possible by variation of the pressure of the gas, as will be shown in greater detail hereinafter. FIG. 3 is a graphical representation of the percent transmission of infrared rays versus the wavelength in microns for nitrous oxide under different pressures. It will be noted that nitrous oxide has varying infrared transmission properties at different pressures, the transmission being greater at lower pressures, as will be seen in FIG. 3. For the pressures noted in the graphical representation, nitrous oxide allows 100 percent transmission of infrared rays for wavelengths of approximately 4.1 to 4.35 microns and prevents transmission of any infrared energy between approximately 4.4 and 4.6 microns. Therefore, it is seen that nitrous oxide produces a sharp absorption cut. Such properties are highly desirable in a filter to be used with a proximity fuze, since infrared output is greatest from a jet plume at approximately 4.35 microns and nitrous oxide allows substantially 100 percent transmission of infrared rays at this wavelength.

The advantageous features of such gaseous filters are the easy shifting of the spectral absorption cut by merely varying the pressure of the gas within the filter or by the controlled addition of certain impurities to the gas. In addition, the possible easing or eliminating of filter mounts and holding devices becomes highly practical in closed systems where the gas can be maintained at a constant pressure without affecting the contacting components. Moreover, the absorption properties of the filter may be varied by merely varying the pressure of the gas, without the necessity of removing and changing the filter element.

Obviously many modifications and variations of the present invention are possible in light of the above teachings. It is therefore to be understood that within the scope of the appended claims the invention may be practiced otherwise than as specifically described.

One of the special advantages of gaseous filters according to my invention is that the spectral transmission is independent of the angle of incidence of the radiation, whereas the filters of the optical interference type, the effective thickness of the layers of such filters become less at oblique angles of incidence, and hence there is a shift of the transmission band to shorter wavelength.

What is claimed as new and desired to be secured by Letters Patent of the United States is:

1. An optical filter for discrimination purposes in the infrared region compressing a casing containing an infrared absorbing gas which is effective to produce an extremely sharp absorption cut-off point when infrared radiation having wavelengths within a predetermined range is applied thereto to thereby pass infrared radiation of wavelengths outside of said range, said casing having a circular configuration for close fitting engagement with a complementary aperture within the nose of proximity fuze.

2. The apparatus of claim 1 wherein the gas is nitrous oxide.

3. Apparatus of claim 1 wherein the gas is aluminum borohyride.

4. The apparatus of claim 1 wherein the gas is carbon dioxide.

5. The apparatus of claim 1 having means to vary the pressure of said gas whereby said absorption cut-off front may be shifted to different infrared wavelengths.

6. The apparatus of claim 1 having means to add impurities to said gas whereby said absorption cut-off point may be shifted to different infrared wavelengths.

7. A gaseous optical filter for solar discrimination purposes in the infrared region comprising a hollow closed cylindrical body portion having an aperture therein and containing a gas under pressure which will pass infrared radiation with a predetermined range of frequencies, a source of variable pressure, a source of impurities, and three-wave valve means connected to said body portion at the aperture and to said variable pressure and impurities sources to selectively establish a fluid connection therefrom to the aperture in a manner to provide for a variation in the pressure of said gas within said body and for the adding of certain impurities of said gas, the valve also providing means for effectively sealing said aperture when a desired pressure and quantity of impurities within the body have been obtained.

8. The apparatus of claim 7 wherein the absorbing gas is nitrous oxide.

9. The apparatus of claim 7 wherein the absorbing gas is aluminum borohydride.

10. The apparatus of claim 7 wherein the absorbing gas is carbon dioxide.

* * * * *